United States Patent
Derbanne et al.

(10) Patent No.: US 12,081,869 B2
(45) Date of Patent: Sep. 3, 2024

(54) SYSTEMS AND METHODS FOR STABILIZING VIDEOS

(71) Applicant: GoPro, Inc., San Mateo, CA (US)

(72) Inventors: Thomas Derbanne, Paris (FR); Maxim Karpushin, Paris (FR)

(73) Assignee: GoPro, Inc., San Mateo, CA (US)

( * ) Notice: Subject to any disclaimer, the term of this patent is extended or adjusted under 35 U.S.C. 154(b) by 0 days.

(21) Appl. No.: 18/311,674

(22) Filed: May 3, 2023

(65) Prior Publication Data
US 2023/0319405 A1    Oct. 5, 2023

Related U.S. Application Data

(63) Continuation of application No. 17/619,429, filed as application No. PCT/US2020/038639 on Jun. 19, 2020, now Pat. No. 11,659,279.

(60) Provisional application No. 62/864,631, filed on Jun. 21, 2019.

(51) Int. Cl.
*H04N 23/68* (2023.01)
*H04N 5/262* (2006.01)

(52) U.S. Cl.
CPC ......... *H04N 23/683* (2023.01); *H04N 5/2628* (2013.01); *H04N 23/6812* (2023.01)

(58) Field of Classification Search
None
See application file for complete search history.

(56) References Cited

U.S. PATENT DOCUMENTS

| | | | |
|---|---|---|---|
| 9,922,398 B1 | 3/2018 | Jenny | |
| 10,187,607 B1 | 1/2019 | Delachanal | |
| 10,262,691 B1 | 4/2019 | Gilmour | |
| 2002/0102101 A1 | 8/2002 | Pelletier | |
| 2005/0280707 A1 | 12/2005 | Sablak | |
| 2013/0182134 A1* | 7/2013 | Grundmann | H04N 23/683 348/208.6 |
| 2014/0267801 A1 | 9/2014 | Grundmann | |
| 2015/0062360 A1 | 3/2015 | Campbell | |

(Continued)

FOREIGN PATENT DOCUMENTS

| | | |
|---|---|---|
| CN | 104126299 A | 10/2014 |
| CN | 106464802 A | 2/2017 |
| CN | 109076160 A | 12/2018 |

OTHER PUBLICATIONS

Extended European Search Report issued in App. No. EP20827732, dated Jun. 13, 2023, 12 pages.

(Continued)

*Primary Examiner* — James M Hannett
(74) *Attorney, Agent, or Firm* — ESPLIN & ASSOCIATES, PC

(57) ABSTRACT

A video may be captured by an image capture device in motion. A stabilized view of the video may be generated by providing a punchout of the video. The punchout of the video may compensate for rotation of the image capture device during capture of the video. Different field of view punchouts, such as wide field of view punchout and linear field of view punchout, may be used to stabilize the video. Different field of view punchouts may provide different stabilization margins to stabilize the video. The video may be stabilized by switching between different field of view punchouts based on the amount of stabilization margin needed to stabilize the video.

20 Claims, 8 Drawing Sheets

(56) References Cited

U.S. PATENT DOCUMENTS

2015/0222818 A1    8/2015  Karpenko
2017/0041545 A1*   2/2017  Murgia .............. H04N 23/6812
2018/0048821 A1    2/2018  Segapelli
2018/0302567 A1   10/2018  Watanabe
2022/0247930 A1    8/2022  Derbanne

OTHER PUBLICATIONS

Hanning et al. "Stabilizing cell phone video using inertial measurement sensors." In: 2011 International Conference on Computer Vision Workshops (ICCV Workshops). Nov. 13, 2011 (Nov. 13, 2011) Retrieved on Aug. 12, 2020 (Aug. 12, 2020) from <http://people.isy.liu.se/en/cvl/perfo/papers/hanning_iwmv11.pdf>.
International Search Report and Written Opinion for App. No. PCT/US2020/038639, dated Sep. 4, 2020, 9 pages.

* cited by examiner

SYSTEMS AND METHODS FOR STABILIZING VIDEOS

FIELD

This disclosure relates to stabilizing videos based on field of view distortion adjustment.

BACKGROUND

A video may have been captured by an image capture device in motion. The motion of the image capture device during the capture of the video may cause the video to appear jerky/shaky.

SUMMARY

This disclosure relates to stabilizing videos. Video information and/or other information may be obtained. The video information may define a video. The video may include video content having a progress length. The video content may include visual content of a scene captured by an image capture device during a capture duration. The visual content may have a field of view. The visual content may be stabilized using a punchout of the visual content and/or other information. The punchout of the visual content may include a wide field of view punchout of the visual content, a linear field of view punchout of the visual content, and/or other field of view punchout of the visual content. The linear field of view punchout may be smaller than the wide field of view punchout. Stabilized visual content may include a distortion based on usage of the wide field of view punchout such that a straight line within the scene appears curved within the stabilized visual content. The stabilized visual content may not include the distortion based on usage of the linear field of view punchout such that the straight line within the scene appears straight within the stabilized visual content.

Stabilization performance information and/or other information may be obtained. The stabilization performance information may characterize stabilization performance using the wide field of view punchout of the visual content. The usage of the wide field of view punchout and the usage of the linear field of view punchout for the stabilization of the visual content may be switched based on the stabilization performance information and/or other information.

A system that stabilizes videos may include one or more electronic storages, one or more processors, and/or other components. An electronic storage may store video information defining a video, information relating to the video, information relating to video content, information relating to visual content, information relating to an image capture device, information relating to a capture duration, information relating to stabilization of visual content, information relating to a punchout of visual content, information relating to a wide field of view punchout of the visual content, information relating to a linear field of view punchout of the visual content, information relating to stabilized visual content, stabilization performance information, information relating to stabilization performance using the wide field of view punchout of the visual content, information relating to switch between the usage of the wide field of view punchout and the usage of the linear field of view punchout for the stabilization of the visual content, and/or other information. In some implementations, the system may include one or more optical elements, one or more image sensors, one or more position sensors, and/or other components.

One or more components of the system may be carried by a housing, such as a housing of an image capture device. For example, the optical element(s), the image sensor(s), and/or the position sensor(s) of the system may be carried by the housing of an image capture device. The housing may carry other components, such as the processor(s) and/or the electronic storage.

The processor(s) may be configured by machine-readable instructions. Executing the machine-readable instructions may cause the processor(s) to facilitate stabilizing videos. The machine-readable instructions may include one or more computer program components. The computer program components may include one or more of a video information component, a stabilization component, a stabilization performance component, a switch component, and/or other computer program components.

The video information component may be configured to obtain video information and/or other information. Video information may define a video. The video may include video content having a progress length. The video content may include visual content of a scene captured by an image capture device during a capture duration. The visual content may have a field of view. In some implementations, the field of view of the visual content may include a wide field of view, and the visual content may include a wide field of view depiction of the scene.

The stabilization component may be configured to stabilize the visual content using a punchout of the visual content and/or other information. The punchout of the visual content may include different field of view punchouts of the visual content. For example, the punchout of the visual content may include a wide field of view punchout of the visual content, a linear field of view punchout of the visual content, and/or other field of view punchout of the visual content. The linear field of view punchout may be smaller than the wide field of view punchout. Stabilized visual content may include a distortion based on usage of the wide field of view punchout such that a straight line within the scene appears curved within the stabilized visual content. The stabilized visual content may not include the distortion based on usage of the linear field of view punchout such that the straight line within the scene appears straight within the stabilized visual content.

In some implementations, the wide field of view punchout may be larger or equal to 120 degrees and the linear field of view punchout may be smaller or equal to 90 degrees.

In some implementations, the punchout of the visual content may include extents of the visual content within a viewing window. The viewing window may be located within the field of view of the visual content. In some implementations, location of the viewing window within the field of view of the visual content may be determined based on rotational positions of the image capture device during the capture duration and/or other information.

The stabilization performance component may be configured to obtain stabilization performance information and/or other information. The stabilization performance information may characterize stabilization performance using the wide field of view punchout of the visual content and/or other field of view punchout of the visual content.

In some implementations, the stabilization performance information may be determined based on an extent to which desired stabilization is able to be performed using the punchout of the visual content and/or other information. The extent to which the desired stabilization is able to be performed using the punchout of the visual content may include a frequency with which the desired stabilization requires the viewing window to extend beyond the field of view of the visual content. The extent to which the desired stabilization is able to be performed using the punchout of the visual content may include a spatial amount by which the desired stabilization requires the viewing window to extend beyond the field of view of the visual content.

In some implementations, the stabilization performance information may be determined based on rotational positions of the image capture device during the capture duration and/or other information.

The switch component may be configured to switch between the usage of different field of view punchouts for the stabilization of the visual content based on the stabilization performance information and/or other information. For example, the switch component may be configured to switch between the usage of the wide field of view punchout, the usage of the linear field of view punchout, and/or the usage of other field of view punchout for the stabilization of the visual content based on the stabilization performance information and/or other information.

In some implementations, switch between the usage of the wide field of view punchout and the usage of the linear field of view punchout for the stabilization of the visual content may not cause a linear zooming effect within stabilized visual content.

These and other objects, features, and characteristics of the system and/or method disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a," "an," and "the" include plural referents unless the context clearly dictates otherwise.

DETAILED DESCRIPTION

Figure 1:
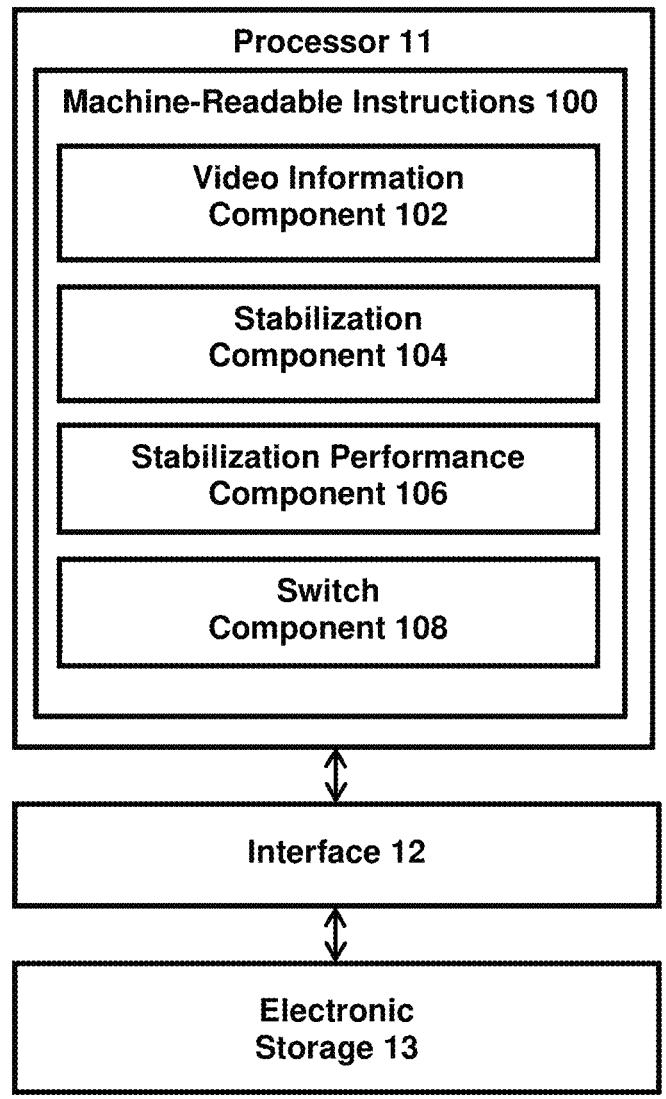
FIG. 1 illustrates an example system that stabilizes videos.

FIG. 1 illustrates a system 10 for stabilizing videos. The system 10 may include one or more of a processor 11, an interface 12 (e.g., bus, wireless interface), an electronic storage 13, and/or other components. In some implementations, the system 10 may include one or more optical elements, one or more image sensors, one or more position sensors, and/or other components. Video information and/or other information may be obtained the processor 11. The video information may define a video. The video may include video content having a progress length. The video content may include visual content of a scene captured by an image capture device during a capture duration. The visual content may have a field of view. The visual content may be stabilized using a punchout of the visual content and/or other information. The punchout of the visual content may include a wide field of view punchout of the visual content, a linear field of view punchout of the visual content, and/or other field of view punchout of the visual content. The linear field of view punchout may be smaller than the wide field of view punchout. Stabilized visual content may include a distortion based on usage of the wide field of view punchout such that a straight line within the scene appears curved within the stabilized visual content. The stabilized visual content may not include the distortion based on usage of the linear field of view punchout such that the straight line within the scene appears straight within the stabilized visual content.

Stabilization performance information and/or other information may be obtained by the processor 11. The stabilization performance information may characterize stabilization performance using the wide field of view punchout of the visual content. The usage of the wide field of view punchout and the usage of the linear field of view punchout for the stabilization of the visual content may be switched based on the stabilization performance information and/or other information.

The electronic storage 13 may be configured to include electronic storage medium that electronically stores information. The electronic storage 13 may store software algorithms, information determined by the processor 11, information received remotely, and/or other information that enables the system 10 to function properly. For example, the electronic storage 13 may store video information defining a video, information relating to the video, information relating to video content, information relating to visual content, information relating to an image capture device, information relating to a capture duration, information relating to stabilization of visual content, information relating to a punchout of visual content, information relating to a wide field of view punchout of the visual content, information relating to a linear field of view punchout of the visual content, information relating to stabilized visual content, stabilization performance information, information relating to stabilization performance using the wide field of view punchout of the visual content, information relating to switch between the usage of the wide field of view punchout and the usage of the linear field of view punchout for the stabilization of the visual content, and/or other information.

The processor 11 may be configured to provide information processing capabilities in the system 10. As such, the processor 11 may comprise one or more of a digital processor, an analog processor, a digital circuit designed to process information, a central processing unit, a graphics processing unit, a microcontroller, an analog circuit designed to process information, a state machine, and/or other mechanisms for electronically processing information. The processor 11 may be configured to execute one or more machine-readable instructions 100 to facilitate stabilizing videos. The machine-readable instructions 100 may include one or more computer program components. The machine-readable instructions 100 may include one or more of a video information component 102, a stabilization component 104, a stabilization performance component 106, a switch component 106, and/or other computer program components.

Visual content (of image(s), of video frame(s), of video(s)) with a field of view may be captured by an image capture device during a capture duration. Visual content may refer to content of image(s), video frame(s), and/or video(s) that may be consumed visually. A field of view of visual content may define a field of view of a scene captured within the visual content. A capture duration may be measured/defined in terms of time durations and/or frame numbers. For example, visual content may be captured during a capture duration of 60 seconds, and/or from one point in time to another point in time. As another example, 1800 images may be captured during a capture duration. If the images are captured at 30 images/second, then the capture duration may correspond to 60 seconds. Other capture durations are contemplated.

The system 10 may be remote from the image capture device or local to the image capture device. One or more portions of the image capture device may be remote from or a part of the system 10. One or more portions of the system 10 may be remote from or a part of the image capture device. For example, one or more components of the system 10 may be carried by a housing, such as a housing of an image capture device. For instance, optical element(s), image sensor(s), and/or position sensor(s) of the system 10 may be carried by the housing of the image capture device. The housing may carry other components, such as the processor 11 and/or the electronic storage 13. References to a housing of an image capture device may refer to the image capture device, and vice versa. For example, references to position/motion of a housing of an image capture device may refer to position/motion of the image capture device, and vice versa.

Figure 3:
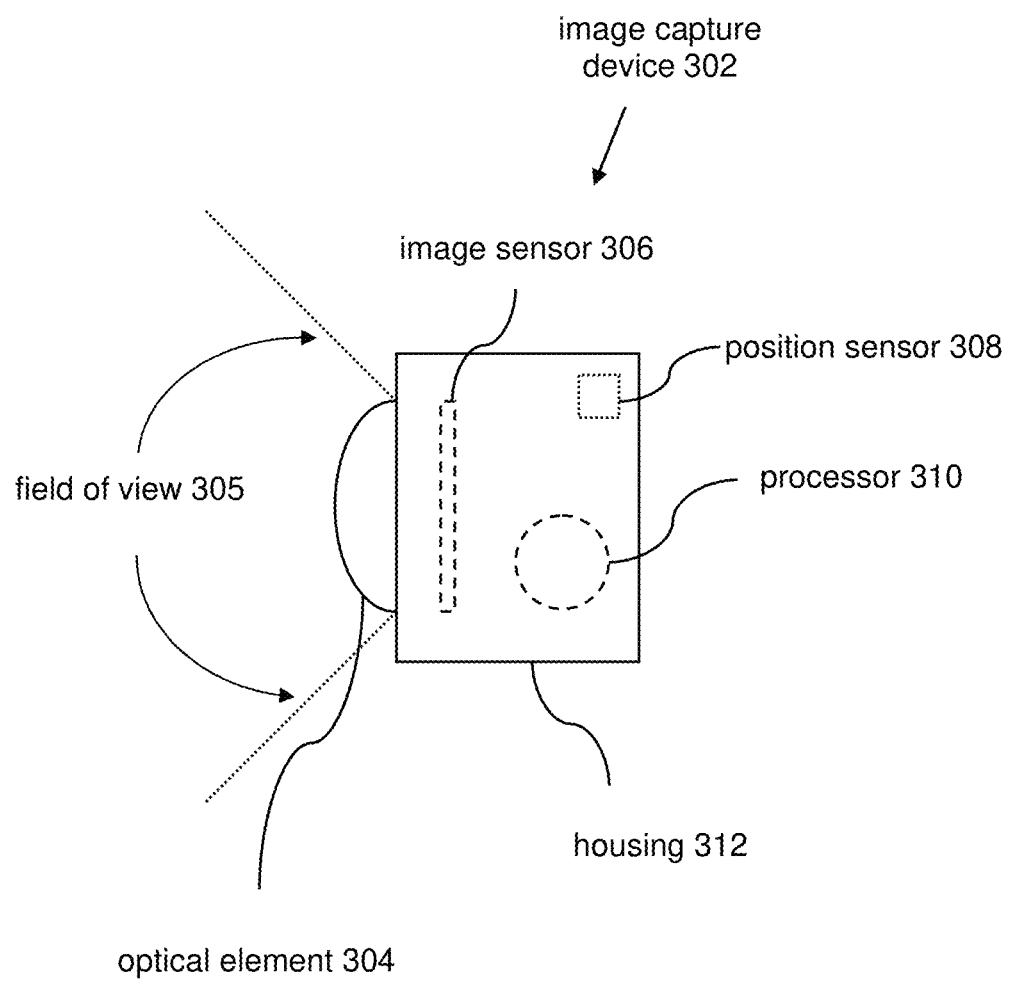
FIG. 3 illustrates an example image capture device.

An image capture device may refer to a device for recording visual information in the form of images, videos, and/or other media. An image capture device may be a standalone device (e.g., camera) or may be part of another device (e.g., part of a smartphone, tablet). FIG. 3 illustrates an example image capture device 302. The image capture device 302 may include a housing 312, and the housing 312 may carry (be attached to, support, hold, and/or otherwise carry) an optical element 304, an image sensor 306, a position sensor 308, a processor 310, and/or other components. Other configurations of image capture devices are contemplated.

The optical element 304 may include instrument(s), tool(s), and/or medium that acts upon light passing through the instrument(s)/tool(s)/medium. For example, the optical element 304 may include one or more of lens, mirror, prism, and/or other optical elements. The optical element 304 may affect direction, deviation, and/or path of the light passing through the optical element 304. The optical element 304 may have a field of view 305. The optical element 304 may be configured to guide light within the field of view 305 to the image sensor 306. The field of view 305 may include the field of view of a scene that is within the field of view of the optical element 304 and/or the field of view of the scene that is delivered to the image sensor 306. For example, the optical element 304 may guide light within its field of view to the image sensor 306 or may guide light within a portion of its field of view to the image sensor 306. The field of view 305 of the optical element 304 may refer to the extent of the observable world that is seen through the optical element 304. The field of view 305 of the optical element 304 may include one or more angles (e.g., vertical angle, horizontal angle, diagonal angle) at which light is received and passed on by the optical element 304 to the image sensor 306. In some implementations, the field of view 305 may be greater than or equal to 180-degrees. In some implementations, the field of view 305 may be smaller than or equal to 180-degrees.

The field of view 305 may be larger than a size of the punchout/viewing window used to generate stabilized visual content. That is, a punchout/viewing window may be used to stabilize visual content captured by the image capture device 302. Stabilization of visual content may include reduction/removal of motion present in the visual content due to motion (e.g., mechanical displacement, rotational motion, translational motion) of the image capture device 302 during visual content capture. Motion of the image capture device 302 during visual content capture may result in motion within the captured visual content. For example, shaking of the image capture device 302 during visual content capture may result in shaky motion within the captured visual content. Such motion within the visual content may be unintentional and/or not be desirable.

Portions of the visual content captured from light within the field of view 305 may be presented on a display and/or used to generate a video. The portions of the visual content presented on the display/used to generate a video may include those portions of the visual content within a viewing window. A viewing window may define extents of the visual content (e.g., of image(s)/video frame(s)) to be included within a punchout. The viewing window may be determined so that the visual content within the presentation/generated video does not include or includes less motion than the visual content. For instance, the visual content may include shaky/jerky footage due to motion of the image capture device 302 during visual content capture, and the viewing window may be determined so that the portion of the visual content that is presented/used for video generation does not appear shaky/jerky or appears less shaky/jerky. For example, the shape, size, and/or the location of the viewing window within the visual content may be determined to compensate for motion of the image capture device 302 during capture such that the video appears to have been captured from an image capture device 302 with less motion. That is, the visual content captured by the image capture device 302 may be cropped to generate stabilized visual content.

The image sensor 306 may include sensor(s) that converts received light into output signals. The output signals may include electrical signals. For example, the image sensor 306 may include one or more of a charge-coupled device sensor, an active pixel sensor, a complementary metal-oxide semiconductor sensor, an N-type metal-oxide-semiconductor sensor, and/or other image sensors. The image sensor 306 may generate output signals conveying information that defines visual content of one or more images and/or one or more video frames of a video. For example, the image sensor 306 may be configured to generate a visual output signal based on light that becomes incident thereon during a capture duration. The visual output signal may convey visual information that defines visual content having the field of view.

The position sensor 308 may include sensor(s) that measures experienced positions and/or motions. The position sensor 308 may convert experienced positions and/or motions into output signals. The output signals may include electrical signals. For example, the position sensor 308 may refer to a set of position sensors, which may include one or more inertial measurement units, one or more accelerometers, one or more gyroscopes, and/or other position sensors. The position sensor 308 may generate output signals conveying information that characterizes positions and/or motions of the position sensor 308 and/or device(s) carrying the position sensor 308, such as the image capture device 302 and/or the housing 312.

For example, the position sensor 308 may be configured to generate a position output signal based on positions of the image capture device 302 during the capture duration. The position output signal may convey position information that characterizes positions of the image capture device 302 at different moments (points in time, time durations) within the capture duration. The position information may characterize positions of the image capture device 302 based on specific translational and/or rotational positions of the image capture device 302 and/or based on changes in translational and/or rotational positions of the image capture device 302 as a function of progress through the capture duration. That is, the position information may characterize translational and/or rotational positions of the image capture device 302 and/or changes in translational and/or rotational positions (motion) of the image capture device 302 (e.g., direction, amount, velocity, acceleration) during the capture duration.

The position information may be determined based on signals generated by the position sensor 308 and independent of the information/signals generated by the image sensor 306. That is, position information may be determined without using visual content/images/videos generated by the image sensor 306. Use of visual content/images/videos to determine positions/motions of the image capture device 302 may be computationally expensive in terms of processing power, processing time, and/or battery consumption. Using the information/signals from the position sensor 308 to determine positions/motions of image capture device 302 may be computationally cheaper. That is, less processing power, processing time, and/or battery consumption may be required when positions/motions of the image capture device 302 are determined from the information/signals from the position sensor 308 than the information/signals from the image sensor 306. The position information determined independent of the image information may be used to determine the positions of the image capture device 302 during the capture duration.

In some implementations, the position information may include data from the position sensor (e.g., gyroscope data, accelerometer data) with time stamps per visual content capture at different moments. For example, the position may include gyroscope data and/or accelerometer data per individual video frames captured by the image capture device. In some implementations, calibration of an inertial measurement unit may be used to combine different data within the position information.

The processor 310 may include one or more processors (logic circuitry) that provide information processing capabilities in the image capture device 302. The processor 310 may provide one or more computing functions for the image capture device 302. The processor 310 may operate/send command signals to one or more components of the image capture device 302 to operate the image capture device 302. For example, the processor 310 may facilitate operation of the image capture device 302 in capturing image(s) and/or video(s), facilitate operation of the optical element 304 (e.g., change how light is guided by the optical element 304), and/or facilitate operation of the image sensor 306 (e.g., change how the received light is converted into information that defines images/videos and/or how the images/videos are post-processed after capture).

The processor 310 may obtain information from the image sensor 306 and/or the position sensor 308, and/or facilitate transfer of information from the image sensor 306 and/or the position sensor 308 to another device/component. The processor 310 may be remote from the processor 11 or local to the processor 11. One or more portions of the processor 310 may be part of the processor 11 and/or one or more portions of the processor 10 may be part of the processor 310. The processor 310 may include and/or perform one or more functionalities of the processor 11 shown in FIG. 1.

For example, the processor 310 may use the position information to stabilize visual content captured through the optical element 304 and/or the image sensor 306. Visual content having a field of view may be captured by the image capture device 302 during a capture duration. The processor 310 may determine the rotational positions of the image capture device as a function of progress through the capture duration and use the rotational positions of the image capture device to determine placement of the viewing window within the field of view of the visual content. The placement of the viewing window within the field of view of the visual content may include one or more of changing the size of the viewing window, changing the shape of the viewing window, and/or changing the location of the viewing window within the field of view based on the rotational positions of the image capture device. The visual content within the viewing window may be used (e.g., cropped) to generate stabilized visual content.

Stabilization of visual content may be performed based on placement of the viewing window within the field of view of the visual content. The placement of the viewing window may compensate for the motion (e.g., unintentional motion) of the image capture device during the capture duration. For example, a viewing window having a smaller size than the field of view of the visual content may be used to provide a punchout of the visual content. The punchout (cropped view) may be moved within the field of view to provide a stabilized view of the visual content.

The viewing window may be oriented with respect to the field of view of the visual content to provide a punchout of the visual content that is stable with respect to prior and/or next punchout of the visual content. For example, the viewing window may be oriented with respect to the field of view of images/video frames captured by the image capture device to provide a punchout of the images/video frames such that the presented content appears to have been captured with a stable/more stable image capture device (e.g., a punchout of a video frame being stable/more stable with a punchout of the preceding video frame and/or a subsequent video frame). The viewing window may be oriented with respect to the field of view of the visual content based on movement of the viewing window and/or movement of the field of view (e.g., movement of visual content in image space).

Figure 4:
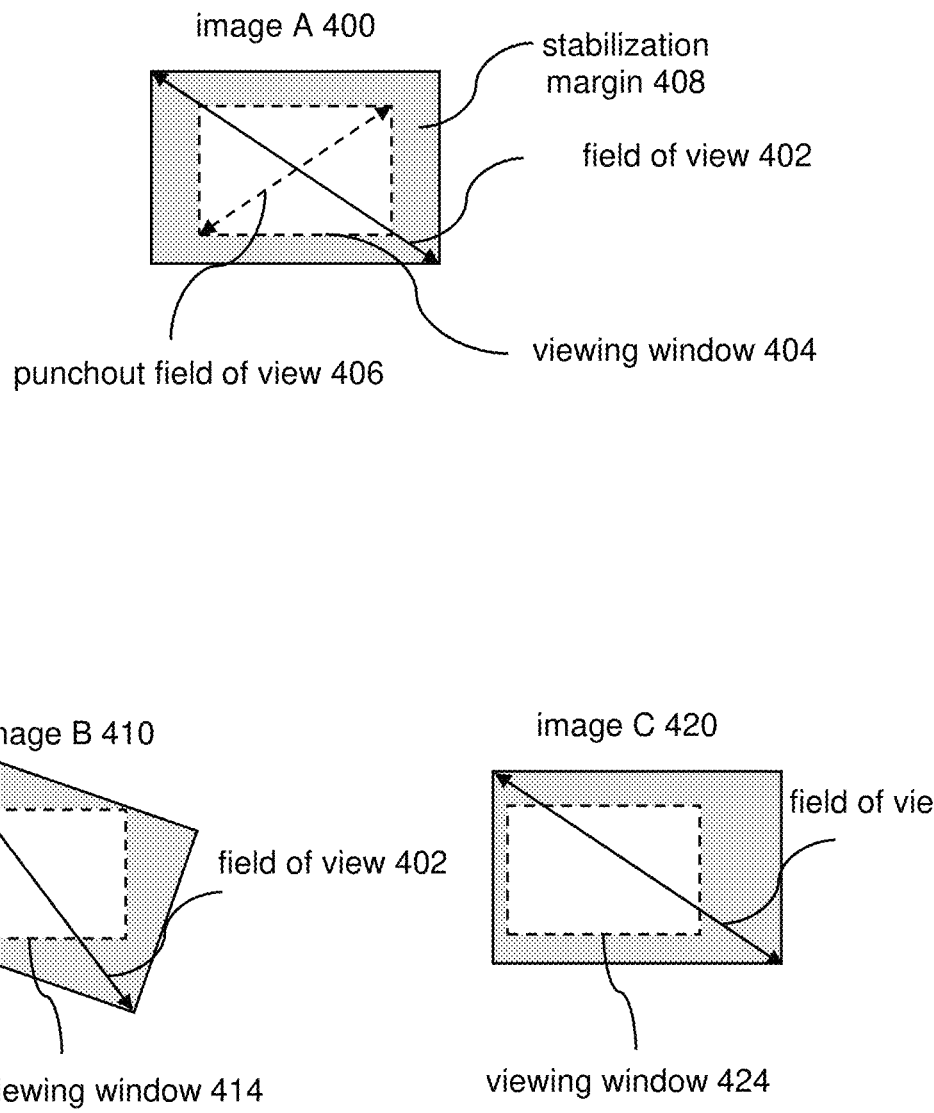
FIG. 4 illustrates example orientations of viewing windows with respect to images.

For example, FIG. 4 example orientations of viewing windows 404, 414, 424 with respect to images 400, 410, 420. The images 400, 410, 420 may have a field of view 402. The viewing windows 404, 414, 424 may have a punchout field of view 406. The images 400, 410, 420 may include capture of a scene within an angle defined by the field of view 402. The viewing windows 404, 414, 424 may provide a punchout of the images 400, 410, 420 to be used for video stabilization. The punchout field of view 406 of the viewing windows 404, 414, 424 may be smaller than the field of view 402 of the images 400, 410, 420. The difference between the field of view 402 and the punchout field of view 406 may define a stabilization margin 408 within which the viewing window 404 may move with respect to the image A 400/field of view 402. The stabilization margin 408 may specify how much the viewing window 404 may move while remaining inside the field of view 402 of the visual content included within the image A 402.

Placements of the viewing window 404, 414, 424 within the field of view 402 (orientation of the viewing window 404 with respect to the field of view 402) may be changed to perform video stabilization. For example, the viewing window 414 may be rotated with respect to the field of view 402 of the image B 610 while not going beyond the pixels captured within the image B 410. The viewing window 424 may be laterally moved with respect to the field of view 402 of the image C 420 while not going beyond the pixels captured within the image C 420. The placements of the viewing window 404, 414, 424 may be determined based on the positions/motions of the image capture device when the images 400, 410, 420 were captured.

For instance, the viewing window 414 may be oriented with respect to the field of view 402 of the image B 410 to provide a punchout of the image B 410 that is stable with respect to a prior and/or next punchout of the images (e.g., stable with the punchout of the image A 400 using the viewing window 404 for the image A 400). The orientation of the viewing window 414 with respect to the field of view 402 of the image B 410 may be determined based on the rotational position of the image capture device from which the image B 410 was captured. Similarly, the viewing window 424 may be oriented with respect to the field of view 402 of the image C 420 to provide a punchout of the image C 420 that is stable with respect to a prior and/or next punchout of the images (e.g., stable with the punchout of the image B 410 using the viewing window 414 for the image B 410).

Smaller sizes of the punchout/viewing window (e.g., smaller punchout field of view) may enable greater stabilization of motion within the visual content caused by the motion of the image capture device. Using a smaller punchout/viewing window may enable the punchout to be moved to greater extent before the punchout hits an edge of the visual content. However, smaller punchout/viewing window may provide a smaller view (smaller portion) of the visual content.

Dynamically changing the size of the punchout/viewing window based on extent of image capture device motion may enable larger spatial extents of the visual content to be included within the punchout/viewing window when the visual content is captured by a relatively stable image capture device and smaller spatial extents of the visual content to be included within the punchout/viewing window when the visual content is captured by a shaky image capture device. However, simply changing the size of the punchout/viewing window may result in a zooming effect within the stabilized visual content. For instance, increasing the size of the punchout/viewing window may result in the stabilized visual content appearing to have been captured while zooming out while decreasing the size of the punchout/viewing window may result in the stabilized visual content appearing to have been captured while zooming in. Such zooming effect (linear zooming effect) may be apparent within the stabilized visual content and may be distracting.

The shape of the punchout/viewing window may be changed as a function of progress through the progress length of the visual content to include different spatial extents of the visual content within the stabilization visual content. The shape of the punchout/viewing window may be changed based on the amount of stabilization margin (e.g., the stabilization margin 408) that is needed to stabilize the visual content. Differently shaped punchout/viewing window may have different sizes, resulting in different amount of stabilization margin for movement of the punchout/viewing window for stabilization. For example, differently shaped punchouts that may be used to stabilize visual content may include one or more of a wide field of view punchout, a linear field of view punchout, and/or other field of view punchouts.

The shape of the punchout may determine the type of distortion present within the visual content. Distortion may refer to deviation from rectilinear projection. Rectilinear projection may store and/or present the visual content such that a straight line within a scene captured within the visual content appears straight in the visual content (e.g., in the image, video frame). For example, the shape of the wide field of view punchout may result in a distortion (e.g., barrel distortion) of the visual content within the wide field of view punchout such that a straight line within the scene appears curved within the visual content within the wide field of view punchout while the shape of the linear field of view punchout may not result in the distortion (e.g., barrel distortion) of the visual content within the linear field of view punchout such that a straight line within the scene appears straight within the visual content within the linear field of view punchout. The linear field of view punchout may include the visual content using the rectilinear projection and/or other projections.

Figure 5A:
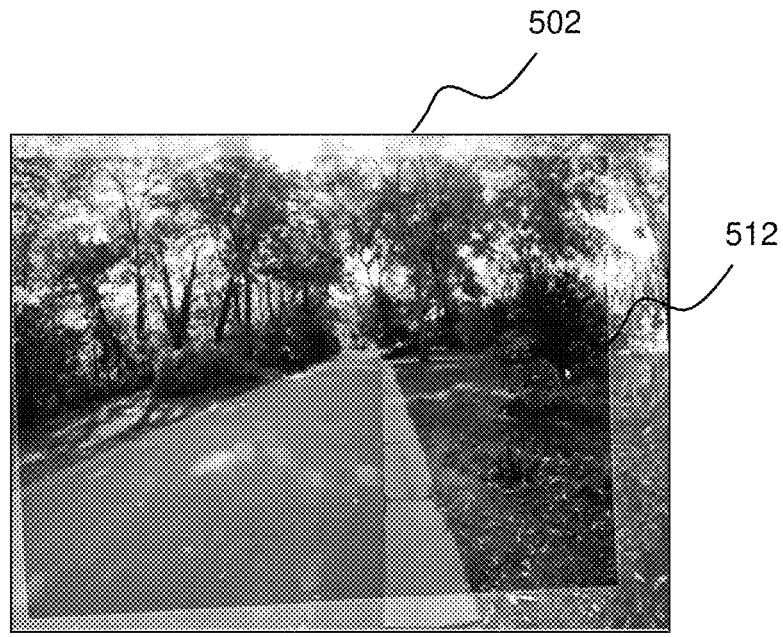
FIG. 5A illustrates an example wide field of view punchout of an image.
Figure 5B:
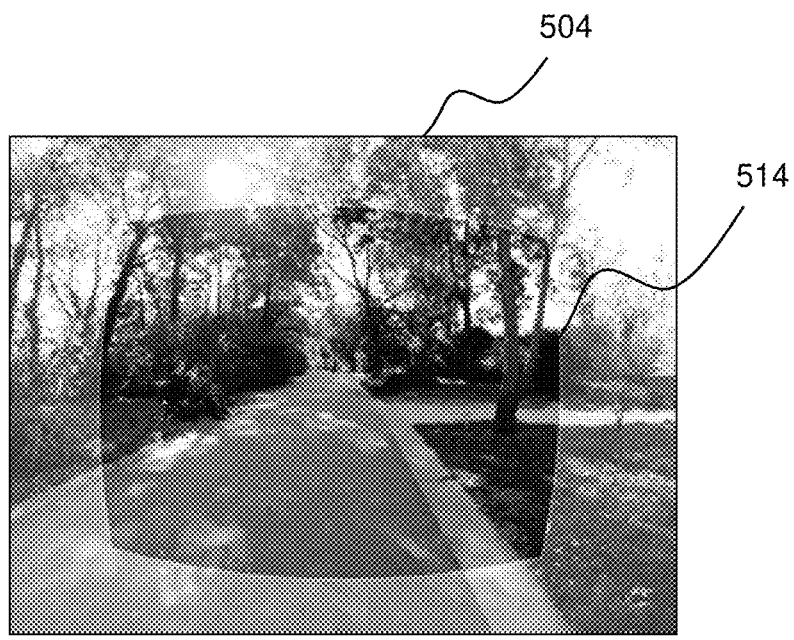
FIG. 5B illustrates an example linear field of view punchout of an image.

FIG. 5A illustrates an example wide field of view punchout 512 of an image 502, and FIG. 5B illustrates an example linear field of view punchout 514 of an image 504. The images 502, 504 may have been captured by an image capture device (e.g., the image capture device 302). The images 502, 504 may have a field of view, such as a wide field of view. For example, the field of view 305 may include a wide field of view and the visual content of the images 502, 504 may include the wide field of view. The visual content of the images 502, 504 may include wide field of view depictions of the scene captured within the images 502, 504.

Figure 6A:
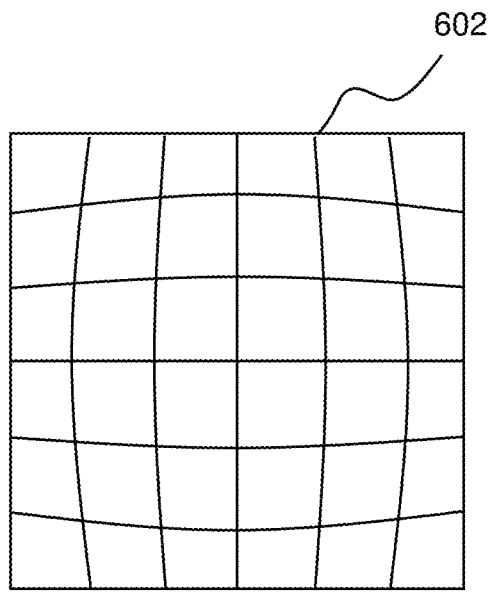
FIG. 6A illustrates an example distortion within a wide field of view punchout of an image.
Figure 6B:
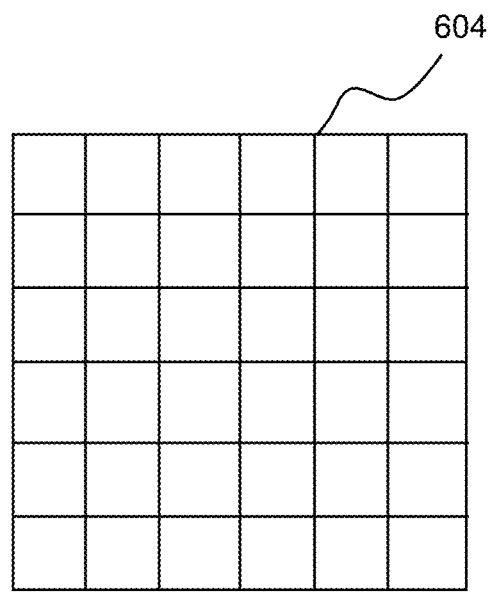
FIG. 6B illustrates lack of the distortion shown in FIG. 6A within a linear field of view punchout of an image.

The shape of the wide field of view punchout 512 (of the wide field of view image 502) may result in a distortion of the visual content within the wide field of view punchout 512. For example, the shape of the wide field of view punchout 512 may result in a barrel distortion (fish-eye effect) of the visual content within the wide field of view punchout 512. A barrel distortion may cause a straight line within the scene captured within the visual content to curve in a shape of a barrel. Barrel distortion may be present within visual content of the images 502, 504 due to capture of the images 502, 504 using a wide-view optical element (e.g., fisheye lens). Use of the wide field of view punchout 512 for the visual content of the image 502 may result in the visual content within the wide field of view punchout 512 including a barrel distortion. FIG. 6A illustrates an example barrel distortion within a wide field of view punchout of an image 302 (the wide field of view punchout 512 of the image 502). Use of the linear field of view punchout 514 for the visual content of the image 504 may result in the visual content within the linear field of view punchout 514 not including the barrel distortion. FIG. 6B illustrates lack of the barrel distortion shown in FIG. 6A within a linear field of view punchout of an image 604 (the linear field of view punchout 514 of the image 504). Other shapes of punchout and other distortions of visual content are contemplated.

A linear field of view punchout (e.g., the linear field of view punchout 514) may be smaller than a wide field of view punchout (e.g., the wide field of view punchout 512). For example, the wide field of view punchout 512 may be larger or equal to 120 degrees (e.g., horizontal angle) and the linear field of view punchout 514 may be smaller or equal to 90 degrees (e.g., horizontal angle). The smaller size of the linear field of view punchout may provide greater stabilization margin for the linear field of view punchout to move within the image for stabilization. The larger size of the wide field of view punchout may provide less stabilization margin for the wide field of view punchout to move within the image for stabilization.

Figure 7A:
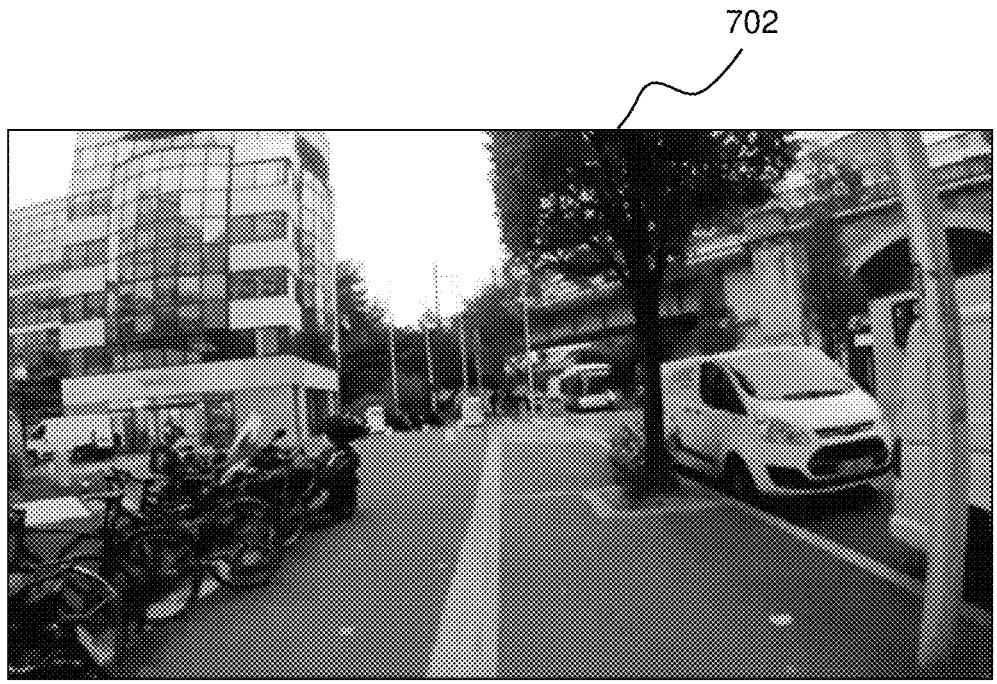
FIG. 7A illustrates an example wide field of view punchout of an image.
Figure 7B:
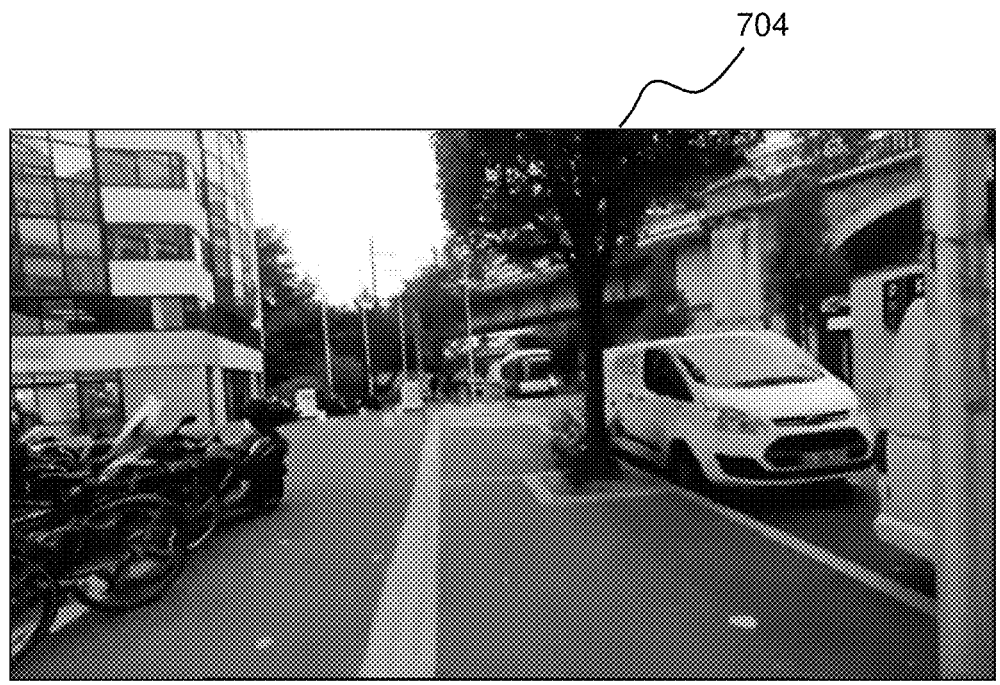
FIG. 7B illustrates an example linear field of view punchout of an image.

FIG. 7A illustrates an example wide field of view punchout 702 of an image, and FIG. 7B illustrates an example linear field of view punchout 704 of the image. As shown in FIGS. 7A and 7B, the use of the wide field of view punchout results in greater spatial extent of the image being included within the wide field of view punchout 702 and the use of the linear field of view punchout results in lesser spatial extent of the image being included within the linear field of view punchout 704. The use of the wide field of view punchout may result in straight lines within the scene appearing curved within the wide field of view punchout 702. Straight lines may appear more curved the further the straight lines are depicted from the center of the wide field of view punchout 702. The use of the linear field of view punchout may result in straight lines within the scene appearing straight within the linear field of view punchout 704.

Even though greater amount of spatial extent of the visual content is included within the wide field of view punchout 702 than the linear field of view punchout 704, switch between the wide field of view punchout 702 to the linear field of view punchout 704, or vice versa, may not include a perceivable zooming effect. The switch between the usage of the wide field of view punchout 704 and the usage of the linear field of view punchout 702 for stabilization of visual content of images/video frames may not cause a linear zooming effect within punchouts. A linear zooming effect may include same change in zoom through the spatial extent of the visual content. For example, change in viewing window by a factor of 2× may result in a linear zooming effect in which appearances of different portions of the visual content are doubled in size. Such change in sizes of the visual content may be apparent to a viewer.

The switch between the usage of the wide field of view punchout 704 and the usage of the linear field of view punchout 702 for stabilization of visual content of images/ video frames may not cause a linear zooming effect within punchouts (stabilized visual content). The switch between the usage of the wide field of view punchout 704 and the usage of the linear field of view punchout 702 for stabilization of visual content of images/video frames may cause a non-linear zooming effect within punchouts. A non-linear zooming effect may include different changes in zoom and/or warping through the spatial extent of the visual content. For example, the peripheral portions of the wide field of view punchout 704 may include more zooming/ warping than the center portion of the wide field of view punchout 704. The appearances of the center portion of the wide field of view punchout 704 and the linear field of view punchout 702 may be the same or not include as much change as the peripheral portions.

Such non-linear changes within the punchout of the visual content may not be apparent or may not be as apparent as linear changes in punchout of the visual content (linear zooming effect), especially when the visual content includes motion (e.g., forward motion, reverse motion, panning motion) due to intentional motion of the image capture device during visual content capture. For example, depiction of scenes (e.g., objects, environment) within visual content may be change as a function of progress through the progress length of the visual content due to forward motion of the image capture device during visual content capture (e.g., person wearing a camera that is recording a video while jogging). Such motion may disguise the non-linear changes within the punchout of the visual content caused by switching between the usage of the wide field of view punchout and the usage of the linear field of view punchout for stabilization of visual content.

In some implementations, the visual content captured by the image capture device may be leveled as the function of progress through the progress length based on the rotational positions of the image capture device as the function of progress through the capture duration and/or other information. That is, the visual content captured by the image captured device may be rotated to compensate for rotation of the image capture device during the capture duration such that a view of the visual content includes depiction of leveled scene. For example, readings from the position sensor may be used to determine the direction of gravity when visual content is captured at different moments within the capture duration. The direction of gravity may be used to determine the amount of rotation that needs to be applied to the visual content to level the depiction within the visual content. For example, the visual content may be rotated so that the direction of gravity is pointed downwards. The rotation of the visual content may be effectuated through rotation of the visual content itself and/or through orientation of the punchout/viewing window with respect to the field of view of the visual content.

Referring back to FIG. 1, the processor 11 (or one or more components of the processor 11) may be configured to obtain information to facilitate stabilizing videos. Obtaining information may include one or more of accessing, acquiring, analyzing, determining, examining, identifying, loading, locating, opening, receiving, retrieving, reviewing, storing, and/or otherwise obtaining the information. The processor 11 may obtain information from one or more locations. For example, the processor 11 may obtain information from a storage location, such as the electronic storage 13, electronic storage of information and/or signals generated by one or more sensors, electronic storage of a device accessible via a network, and/or other locations. The processor 11 may obtain information from one or more hardware components (e.g., an image sensor, a position sensor) and/or one or more software components (e.g., software running on a computing device).

The video information component 102 may be configured to obtain video information and/or other information. Obtaining video information may include one or more of accessing, acquiring, analyzing, determining, examining, identifying, loading, locating, opening, receiving, retrieving, reviewing, storing, and/or otherwise obtaining the video information. The video information component 102 may obtain video information from one or more hardware components (e.g., an image sensor) and/or one or more software components (e.g., software running on a computing device).

The video information may define a video. The video information component 102 may obtain video information defining a video while the video is being captured by an image capture device. The video information component 102 may obtain video information defining a video after the video has been captured and stored in memory (e.g., the electronic storage 13).

In some implementations, the video information component 102 may obtain video information based on user interaction with a user interface/application (e.g., video editing application, video player application), and/or other information. For example, a user interface/application may provide option(s) for a user to select one or more videos that are to be stabilized and/or played. The video information defining the video may be obtained based on the user's selection of the video content through the user interface/video application. Other selections of video are contemplated.

The video may include video content captured by an image capture device during a capture duration. The video content may have a progress length. The progress length of the video content may correspond to the capture duration for the video. The progress length of the video content may be determined based on the capture duration. The progress length of the video content may be same as the capture duration, shorter than the capture duration (e.g., playback rate of the video content is faster than the capture rate of the video content), and/or longer than the capture duration (e.g., playback rate of the video content is slower than the capture rate of the video content).

The video content may include visual content of one or more scenes captured by an image capture device during the capture duration. A scene may refer to a place and/or a location in which the image capture device is located while capturing visual content. A scene may include one or more portions of a place and/or a location at which the image capture device is directed during capture of the visual content. A scene may include one or more portions of a place and/or a location that are within the field of view of the image capture device during capture of the visual content. A scene may include static things (e.g., environment, non-moving objects) and/or dynamic things (e.g., moving objects). The video content may include visual content captured at different moments within the capture duration. The visual content may be viewable as a function of progress through the progress length. The visual content may have a field of view, such as the field of view 305 shown in FIG. 3. In some implementations, the field of view of the visual content may include a wide field of view, and the visual content may include a wide field of view depiction of the scene(s). In some implementations, wide field of view depiction of a scene may include one or more distortions of the visual content, such as a barrel distortion and/or other distortions.

The video content may include other content, such as audio content. Audio content may be captured during capture of the visual content (e.g., recording of sound captured with the images/video frames) and/or may be captured separately from the capture of the visual content (e.g., song/music provide accompaniment for the playback of the images/video frames, sound recorded before/after capture of the images/video frames). Audio content may include audio/sound captured (e.g., by sound sensor(s), microphone(s)) with the capture of the visual content and/or audio/sound provided as an accompaniment for the visual content. Audio content may include one or more of voices, activities, songs, music, and/or other audio/sounds. For example, audio content may include sounds captured by a single sound sensor or an array of sound sensors. The sound sensor(s) may receive and convert sounds into output signals. The output signals may convey sound information and/or other information. The sound information may define audio content in one or more formats, such as WAV, MP3, MP4, RAW. Audio content may include audio/sound generated by one or more computing devices, such as procedural audio. Audio content may be synchronized with the visual content. For example, audio content may include music, song, and/or soundtrack, and the visual content of the video content may be synchronized with music, song, and/or soundtrack.

The stabilization component 104 may be configured to stabilize the visual content using a punchout of the visual content and/or other information. Visual content may be stabilized provide a smoother view of the captured visual content. Stabilization of visual content may include using smaller spatial extents of the visual content to provide a punchout view of the visual content that creates a more stable view than when viewing the entirety of the visual content. A punchout of the visual content may refer to an output of one or more portions of the visual content for presentation (e.g., current presentation, future presentation based on video generated using the punchout). A punchout of the visual content may refer to extents of the visual content that is obtained for viewing and/or extraction. The extents of the visual content viewable/extracted within the viewing window may be used to provide views of different spatial extents of the visual content.

The punchout of the visual content may include one or more spatial extents of the visual content as a function of progress through the progress length of the visual content to compensate for motion of the image capture device during the corresponding moments within the capture duration. The punchout of the visual content may include different field of view punchouts of the visual content over (e.g., as a function of progress through) the progress length of the visual content. Different field of view punchouts may include punchouts with different shapes, punchouts with different distortion characteristics (e.g., barrel roll distortion of a wide field of view, non-distortion of a linear field of view), and/or punchouts with different sizes.

For example, the punchout of the visual content may include a wide field of view punchout of the visual content, a linear field of view punchout of the visual content, and/or other field of view punchout of the visual content. The linear field of view punchout may be smaller than the wide field of view punchout (e.g., shown in FIGS. 5A, 5B). For example, the wide field of view punchout may be larger or equal to 120 degrees (e.g., horizontal angle) and the linear field of view punchout may be smaller or equal to 90 degrees (e.g., horizontal angle).

Stabilized visual content (visual content within the punchout) may include one or more distortions based on usage of one or more field of view punchouts. The stabilized visual content may include one or more distortions corresponding to the used field of view punchout. For example, the stabilized visual content may include a distortion (e.g., barrel distortion) corresponding to the wide field of view punchout based on usage of the wide field of view punchout such that a straight line within the scene appears curved within the stabilized visual content (e.g., shown in FIGS. 6A, 7A). The stabilized visual content may not include the distortion (e.g., barrel distortion) corresponding to the wide field of view punchout based on usage of the linear field of view punchout such that a straight line within the scene appears straight within the stabilized visual content (e.g., shown in FIGS. 6B, 7B).

In some implementations, the stabilized visual content may include less distortion (e.g., barrel distortion) corresponding to the wide field of view punchout based on usage of a field of view punchout between the linear field of view punchout and the wide field of view punchout such that a straight line within the scene appears less curved within the stabilized visual content than based on usage of the wide field of view punchout, but appears more curved within the stabilized visual content than based on usage of the linear field of view punchout. Other shapes, sizes, and distortions of punchout are contemplated.

Thus, changing between different field of view punchout may result in different field of view distortion being included within the stabilized visual content. That is, changing between different field of view punchout for stabilization may result in adjustment of field of view distortion.

The punchout of the visual content may include extents of the visual content within one or more viewing windows. A viewing window may define one or more extents of the visual content. A viewing window may define extents of the visual content to be included within stabilized visual content as the function of progress through the progress length. A viewing window may define which portions of the visual content are included within the stabilized visual content at different moment within the progress length. Inclusion of the extents of the visual content defined by the viewing window within the stabilized visual content may effectuate stabilization of the visual content.

A viewing window may be located within the field of view of the visual content. Location of the viewing window within the field of view of the visual content may be determined based on positions (e.g., rational positions, translational positions, changes in positions) of the image capture device during the capture duration and/or other information. For example, the location of the viewing window within the field of view of the visual content may change as a function of progress through the progress length of the visual content based on rotational positions of the image capture device and/or changes in rotational positions (motion) of the image capture device at different moments within the capture duration (as a function of progress through the capture duration). Determining the location of the viewing window based on the positions of the image capture device may include determining one or more of viewing directions, viewing rotations, and/or other characteristics of the viewing window.

A viewing direction may define a direction of view for visual content. A viewing direction may define the angle/visual portion of the visual content at which the viewing window may be directed. Changes in the viewing direction as the function of progress through the progress length may effectuate movement (e.g., panning) of the viewing window within the field of view of the visual content.

A viewing rotation may define a rotation of the viewing window. A viewing rotation may define one or more rotations of the viewing window about one or more axis. For example, a viewing rotation may be defined based on rotation about an axis corresponding to a viewing direction (e.g., roll). Changes in the viewing rotation as the function of progress through the progress length may effectuate rotation of the viewing window within the field of view of the visual content. The rotation of the viewing window may compensate for rotation of the image capture device during capture duration.

Stabilized visual content may be generated as outputs of portions of the visual captured by the image capture device, with the outputted portions including extent(s) of the visual content within the punchout/viewing window. Inclusion of the extent(s) of the visual content within the punchout/viewing window may effectuate stabilization of the visual content via selective cropping. Stabilized visual content may be generated as encoded visual content and/or as instructions for rendering the stabilized visual content. For instance, the stabilized visual content may be generated as an encoded version/copy of the stabilized visual content (e.g., encoded video file) and/or a director track that defines the extents of the visual content to be used/presented during playback.

For example, the stabilized visual content may be generated as video frames in a video file, and the video file may be opened in a video player for presentation of the stabilized visual content. The stabilized visual content may be generated as instructions to render the visual content for presentation. The instructions (e.g., director track) may which define visual portions of the visual content (images, video frames) should be included within the presentation of the video content. The instructions may include information on the location, size, shape, and/or rotation of the punchout of images/video frames to be used to as a function progress through the progress length of the visual content to provide a stabilized view of the images/video frames. A video player may use the instructions to retrieve the relevant visual portions of the images/video frames when the visual content is opened and/or is to be presented.

The stabilization performance component 106 may be configured to obtain stabilization performance information and/or other information. Obtaining stabilization performance information may include one or more of accessing, acquiring, analyzing, determining, examining, identifying, loading, locating, opening, receiving, retrieving, reviewing, storing, and/or otherwise obtaining the stabilization performance information. The stabilization performance component 106 may obtain stabilization performance information from one or more hardware components (e.g., a position sensor, stabilization hardware) and/or one or more software components (e.g., software running on a computing device, stabilization application). The stabilization performance component 106 may obtain stabilization before, during, and/or after stabilization of the visual content.

The stabilization performance information may characterize stabilization performance using the wide field of view punchout of the visual content, the linear field of view punchout of the visual content, and/or other field of view punchout of the visual content. Stabilization performance using a field of view punchout of visual content may refer to how well the visual content has been, is being, and/or may be stabilized based on the field of view punchout. Stabilization performance using a field of view punchout of visual content may refer to quantitative and/or qualitative measurement of visual content stabilization that has been, is being, and/or may be performed based on the stabilization margin associated with the field of view punchout (e.g., larger stabilization margin associated with the linear field of view punchout, smaller stabilization margin associated with the wide field of view punchout). For example, the stabilization performance may be characterized/indicated by one or more of stabilization score, stabilization level, stabilization percentage, and/or other quantitative and/or qualitative measurement of stabilization.

Stabilization performance using a field of view punchout of visual content may refer an extent to which a desired stabilization has been, is being, and/or may be performed using the field of view punchout. The desired stabilization may refer to a targeted stabilization of the visual content, with the targeted stabilization being specified by one or more stabilization parameters, stabilization defaults, user inputs, and/or other information. For example, the desired stabilization may be determined based on one or more of strength of stabilization, stabilization constraints (e.g., keeping an object within the punchout, restricting the movement of the punchout), stabilization algorithm, and/or other information.

In some implementations, the stabilization performance information may be determined based on an extent to which desired stabilization is able to be performed using the punchout (e.g., linear field of view punchout, wide field of view punchout) of the visual content and/or other information. To perform the desired stabilization, the punchout may need to be moved within the visual content to compensate for motion of the image capture device during capture of the visual content. The desired stabilization may not be performed (obtained) if the motion of the punchout extends beyond the field of view of the visual content.

Figure 8A:
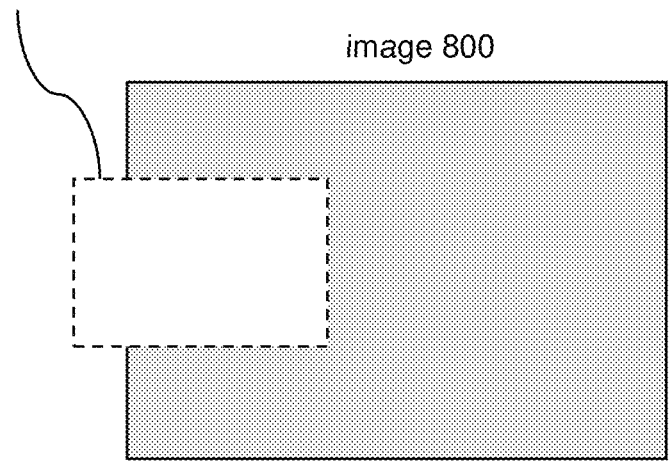
FIG. 8A illustrates an example desired orientation of a viewing window with respect to an image for stabilization.

For example, FIG. 8A illustrates an example desired orientation of a viewing window with respect to an image 800 for stabilization. To perform the desired stabilization of a video including the image 800, the punchout of the image 800 may need to include visual content within a desired viewing window 802. However, the desired viewing window 802 may extend beyond the field of view of the image 800 and violate the stabilization margin of the image 800. The stabilization of the video may be adjusted so that the punchout of the image 800 does not extend beyond the field of view of the image 800.

Figure 8B:
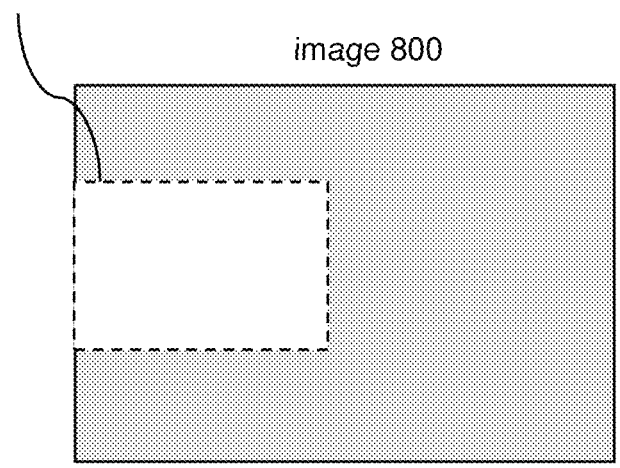
FIG. 8B illustrates an example utilized orientation of a viewing window with respect to an image for stabilization.

For example, FIG. 8B illustrates an example utilized orientation of a viewing window with respect to an image for stabilization. Rather than using the desired viewing window 802 (shown in FIG. 8A), the stabilization of the video may be performed using a punchout of the visual content within a utilized viewing window 804. Stabilization performed using the utilized viewing window 804 may not achieve the desired stabilization. For example, the stabilization of the visual content using the utilized viewing window 804 may include more motion than the desired stabilization.

In some implementations, the extent to which the desired stabilization is able to be performed using the punchout of the visual content may include a number of instances in which desired stabilization requires the viewing window to extend beyond the field of view of the visual content. For example, the stabilization performance information may be determined based how many times over the progress length of the visual content the desired viewing window extends beyond the field of view of the visual content (violates stabilization margin), such as shown in FIG. 8A. In some implementations, the number of instances in which desired stabilization requires the viewing window to extend beyond the field of view of the visual content may be expressed in terms of frequency with which the desired stabilization requires the viewing window to extend beyond the field of view of the visual content—the number of instances during a portion of the progress length the desired viewing window violates the stabilization margin. In some implementations, the number of instances in which desired stabilization requires the viewing window to extend beyond the field of view of the visual content may be expressed based on a sliding window over the progress length of the visual content—the sliding window may define portions of a particular size of the progress length and the stabilization performance may indicate the number of instances in which desired stabilization requires the viewing window to extend beyond the field of view of the visual content within the sliding window.

In some implementations, the extent to which the desired stabilization is able to be performed using the punchout of the visual content may include a spatial amount by which the desired stabilization requires the viewing window to extend beyond the field of view of the visual content. For example, the stabilization performance information may be determined based how much the desired viewing window extends beyond the field of view of the visual content (violates stabilization margin), such as shown in FIG. 8A.

In some implementations, the extent to which the desired stabilization is able to be performed using the punchout of the visual content may both the number of instances in which desired stabilization requires the viewing window to extend beyond the field of view of the visual content and the spatial amount by which the desired stabilization requires the viewing window to extend beyond the field of view of the visual content. For example, both the frequency with which the desired stabilization requires the viewing window to extend beyond the field of view of the visual content and the spatial amounts by which desired viewing window extends beyond the field of view of the visual content may be used in determining the stabilization performance.

In some implementations, the stabilization performance information may be determined based on rotational positions of the image capture device during the capture duration and/or other information. The rotational positions of the image capture device during the capture duration may be used to determine overlaps between fields of view of the visual content as a function of progress length of the visual content. For example, the rotational positions of the image capture device during the capture duration may be used to determine to what extent video frames of a video include capture of the same field of view of a scene. Greater rotational motion (changes in rotational motion) of the image capture device during the capture duration may result in smaller overlaps in depictions of the scene within the captured visual content (e.g., adjacent video frames) and smaller rotational motion of the image during the capture duration may result in larger overlaps in depictions of the scene within the captured visual content. The rotational positions of the image capture device as a function of progress through the capture duration may be used to determine to the extent to which the desired stabilization is able to be performed using the punchout of the visual content as a function of progress through the progress length of the visual content.

The switch component 108 may be configured to switch between the usage of different field of view punchouts for the stabilization of the visual content based on the stabilization performance information and/or other information. The switch component 108 may cause the stabilization of the visual content to switch between different field of view punchouts as a function of progress through the progress length of the visual content. Switching between different field of view punchouts may result in different amounts of stabilization margin being available for stabilization of the visual content. Different field of view punchouts may be used for different portions of the progress length of the visual content based on the amount of stabilization margin needed to stabilize the visual content.

For example, the switch component 108 may be configured to switch between the usage of the wide field of view punchout, the usage of the linear field of view punchout, and/or the usage of other field of view punchout for the stabilization of the visual content based on the stabilization performance information and/or other information. The switch component 108 may determine, as a function of progress through the progress length of the visual content, whether stabilization of the visual content will be performed using the wide field of view punchout, the linear field of view punchout, and/or other field of view punchout. Usage of the linear field of view punchout may result in larger stabilization margin being available for stabilization than usage of the wide field of view punchout. Switching between the usage of the wide field of view punchout and the usage of the linear field of view punchout for the stabilization of the visual content may not cause a linear zooming effect within stabilized visual content.

The switch component 108 may determine switching between different field of view punchouts for the stabilization of the visual content prior to, during, and/or after stabilization of the visual content. For example, the switch component 108 may use stabilization information to determine and switch between usages of different field of view punchouts while the stabilization is being performed. The switch component 108 may use the stabilization information to determine usages of the different field of view punchout before stabilization has started and plan out the switching between usages of different field of view punchouts before the stabilization is performed. The switch component 108 may use the stabilization information to determine usages of the different field of view punchout after initial stabilization and provide switching between usages of different field of view punchouts for a subsequent stabilization.

Switching between the usage of different field of view punchouts for the stabilization of the visual content based on the stabilization performance information may enable switching between the usage of different field of view punchouts based on shakiness of the image capture device during capture duration. The switch component 108 may switch between the usage of different field of view punchouts for the stabilization of the visual content based on the stabilization performance characterized by the stabilization performance information. For example, the stabilization information may characterize stabilization performance using one or more of stabilization score, stabilization level, stabilization percentage, and/or other quantitative and/or qualitative measurement of stabilization. The switch component 108 may switch between the usage of different field of view punchouts for the stabilization of the visual content based on one or more of stabilization score, stabilization level, stabilization percentage, and/or other quantitative and/or qualitative measurement of stabilization.

For example, the switch component 108 may switch between the usage of different field of view punchouts for the stabilization of the visual content to increase/decrease the stabilization margin based on the stabilization score, the stabilization level, the stabilization percentage, and/or other quantitative and/or qualitative measurement of stabilization indicating that the motion of the image capture device during the capture duration satisfies/violates one or more criteria. For instance, the stabilization performance using a particular field of view punchout may be poor (e.g., results in stabilization performance equal to, below, or above a threshold) and the switch component 108 may switch the field of view punchout so that the stabilization margin is increased. The stabilization performance using a particular field of view punchout may be good (e.g., results in stabilization performance equal to, above, or below a threshold) and the switch component 108 may switch to the particular the field of view punchout. In some implementations, the switch component 108 may switch to a field of view punchout that includes the largest extent of the visual content (e.g., largest viewing window) while respecting one or more criteria (e.g., switching to largest field of view punchout that results in stabilization performance satisfying a threshold).

For example, the switch component 108 may switch from usage of the wide field of view punchout to the linear field of view punchout based on the stabilization performance using the wide field of view punchout including a certain number/more than a certain number of instances (e.g., measured as a total number within the progress length, measured as a number within a sliding window, measured as a frequency) in which the desired stabilization requires the viewing window to extend beyond the field of view of the visual content. The switch component 108 may switch from usage of the linear field of view punchout to the wide field of view punchout based on the stabilization performance using the wide field of view punchout including a certain number/less than a certain number of instances in which the desired stabilization requires the viewing window to extend beyond the field of view of the visual content.

The switch component 108 may switch from usage of the wide field of view punchout to the linear field of view punchout based on the stabilization performance indicating that the desired stabilization requires the viewing window to extend beyond the field of view of the visual content by a certain spatial amount/more than a certain spatial amount. The switch component 108 may switch from usage of the linear field of view punchout to the wide field of view punchout based on the stabilization performance indicating that the desired stabilization requires the viewing window to extend beyond the field of view of the visual content by a certain spatial amount/less than a certain spatial amount.

In some implementations, the switch component 108 may switch between usage of the wide field of view punchout and usage of the linear field of view punchout based on a combination of the number of instances in which desired stabilization requires the viewing window to extend beyond the field of view of the visual content, the spatial amount by which the desired stabilization requires the viewing window to extend beyond the field of view of the visual content, and/or other information.

In some implementations, the switch component 108 may utilize a hysteresis approach in switching between different field of view punchouts. A hysteresis approach may include use of different criteria for different direction of switching between different field of view punchouts. For instance, referring to the example of switching based on a frequency with which desired stabilization requires the viewing window to extend beyond the field of view of the visual content, the switch component 108 switch from the wide field of view to the linear field of view based on a first threshold number while using a second threshold number different from the first threshold number for switching from the linear field of view to the wide field of view.

In some implementations, switching between different field of view punchouts may include one or more sequence of switching between different field of view punchouts. For example, a first field of view punchout may be used for visual content captured by a stable image capture device. The switch component 108 may switch from the first field of view punchout to a second field of view punchout (smaller than the first field of view punchout) based on the visual content having been captured by the image capture device while experiencing shaking motion. The switch component 108 may switch from the second field of view punchout to a third field of view punchout (smaller than the second field of view punchout) based on the visual content having been captured by the image capture device while experiencing greater shaking motion. The distortion characteristics of the second field of view punchout may be greater than the distortion characteristics of the first field of view punchout, and the distortion characteristics of the third field of view punchout may be greater than the distortion characteristics of the second field of view punchout.

In some implementations, switching between different field of view punchouts may be performed using a binary approach. The binary approach may include full switching between different field of view punchouts. For example, switching from the wide field of view punchout to the linear field of view punchout may include the wide field of view punchout being used for visual content captured at a moment (a video frame) and the linear field of view punchout being used for visual content captured at the subsequent moment (the next video frame). The binary approach may include use of one field of view punchout at a time.

In some implementations, switching between different field of view punchouts may be performed using a mix approach. The mix approach may include smoothed switching between different field of view punchouts. For example, switching from the wide field of view punchout to the linear field of view punchout may be performed over a duration within the progress length. For instance, the switch may begin for visual content captured at a moment (a beginning video frame) and end at visual content captured at a non-adjacent moment (later video frame not next to the beginning video frame). For example, the switch from the wide field of view punchout to the linear field of view punchout may be performed over 100 video frames, and the punchout may smoothly change from the wide field of view punchout to the linear field of view punchout over the 100 video frames. The mix approach may allow for distortion characteristics of the stabilization visual content to change over a duration of time/multiple frames rather than from one moment (a video frame) to the next moment (next video frame). Other switching between different field of view punchout are contemplated.

In some implementations, the processor 11 may represent multiple processors, and at least one of the processors may be a remote processor located remotely from the housing of the image capture device (e.g., the image capture device 302). One or more of the functionalities of the components 102, 104, 106, 108 may be performed by the image capture device 302 (e.g., by the processor 310) and/or by a remote processor. For example, visual content stabilization (functionalities of the stabilization component 104) and/or punchout switching (functionality of the switch component 108) may be performed by the remote processor during and/or post capture of the visual content by the image capture device. As another example, visual content stabilization and/or punchout switching may be performed by the processor 310 during capture of the visual content to provide the stabilized visual content during capture of the visual content.

In some implementations, the visual content may not be stabilized in/near real time. For example, the image capture device may not have sufficient resource to apply the stabilization technique described herein in real-time and/or may be devoting its resources to other tasks. The stabilization of the visual content may be performed by the image capture device once sufficient resource becomes available. The stabilization of the visual content may be performed by the remote processor. For example, the remote processor may be one or more processors of a remote computing device (e.g., mobile device, desktop, server), and the remote processor may receive video information and the rotational position information captured/generated by the image capture device. The remote computing device (software running on the remote computing device) may apply the stabilization technique described herein post capture of the visual content by the image capture device. The post-capture stabilization of the visual content may be performed by the remote processor responsive to reception of the video information and rotational position information, responsive to user/system command to stabilize the visual content, responsive to the visual content being opened for playback, and/or responsive to other conditions.

Implementations of the disclosure may be made in hardware, firmware, software, or any suitable combination thereof. Aspects of the disclosure may be implemented as instructions stored on a machine-readable medium, which may be read and executed by one or more processors. A machine-readable medium may include any mechanism for storing or transmitting information in a form readable by a machine (e.g., a computing device). For example, a tangible (non-transitory) machine-readable storage medium may include read-only memory, random access memory, magnetic disk storage media, optical storage media, flash memory devices, and others, and a machine-readable transmission media may include forms of propagated signals, such as carrier waves, infrared signals, digital signals, and others. Firmware, software, routines, or instructions may be described herein in terms of specific exemplary aspects and implementations of the disclosure, and performing certain actions.

In some implementations, some or all of the functionalities attributed herein to the system 10 may be provided by external resources not included in the system 10. External resources may include hosts/sources of information, computing, and/or processing and/or other providers of information, computing, and/or processing outside of the system 10.

Although the processor 11 and the electronic storage 13 are shown to be connected to the interface 12 in FIG. 1, any communication medium may be used to facilitate interaction between any components of the system 10. One or more components of the system 10 may communicate with each other through hard-wired communication, wireless communication, or both. For example, one or more components of the system 10 may communicate with each other through a network. For example, the processor 11 may wirelessly communicate with the electronic storage 13. By way of non-limiting example, wireless communication may include one or more of radio communication, Bluetooth communication, Wi-Fi communication, cellular communication, infrared communication, Li-Fi communication, or other wireless communication. Other types of communications are contemplated by the present disclosure.

Although the processor 11 is shown in FIG. 1 as a single entity, this is for illustrative purposes only. In some implementations, the processor 11 may comprise a plurality of processing units. These processing units may be physically located within the same device, or the processor 11 may represent processing functionality of a plurality of devices operating in coordination. The processor 11 may be configured to execute one or more components by software; hardware; firmware; some combination of software, hardware, and/or firmware; and/or other mechanisms for configuring processing capabilities on the processor 11.

It should be appreciated that although computer components are illustrated in FIG. 1 as being co-located within a single processing unit, in implementations in which processor 11 comprises multiple processing units, one or more of computer program components may be located remotely from the other computer program components. While computer program components are described as performing or being configured to perform operations, computer program components may comprise instructions which may program processor 11 and/or system 10 to perform the operation.

While computer program components are described herein as being implemented via processor 11 through machine-readable instructions 100, this is merely for ease of reference and is not meant to be limiting. In some implementations, one or more functions of computer program components described herein may be implemented via hardware (e.g., dedicated chip, field-programmable gate array) rather than software. One or more functions of computer program components described herein may be software-implemented, hardware-implemented, or software and hardware-implemented.

The description of the functionality provided by the different computer program components described herein is for illustrative purposes, and is not intended to be limiting, as any of computer program components may provide more or less functionality than is described. For example, one or more of computer program components may be eliminated, and some or all of its functionality may be provided by other computer program components. As another example, processor 11 may be configured to execute one or more additional computer program components that may perform some or all of the functionality attributed to one or more of computer program components described herein.

The electronic storage media of the electronic storage 13 may be provided integrally (i.e., substantially non-removable) with one or more components of the system 10 and/or as removable storage that is connectable to one or more components of the system 10 via, for example, a port (e.g., a USB port, a Firewire port, etc.) or a drive (e.g., a disk drive, etc.). The electronic storage 13 may include one or more of optically readable storage media (e.g., optical disks, etc.), magnetically readable storage media (e.g., magnetic tape, magnetic hard drive, floppy drive, etc.), electrical charge-based storage media (e.g., EPROM, EEPROM, RAM, etc.), solid-state storage media (e.g., flash drive, etc.), and/or other electronically readable storage media. The electronic storage 13 may be a separate component within the system 10, or the electronic storage 13 may be provided integrally with one or more other components of the system 10 (e.g., the processor 11). Although the electronic storage 13 is shown in FIG. 1 as a single entity, this is for illustrative purposes only. In some implementations, the electronic storage 13 may comprise a plurality of storage units. These storage units may be physically located within the same device, or the electronic storage 13 may represent storage functionality of a plurality of devices operating in coordination.

Figure 2:
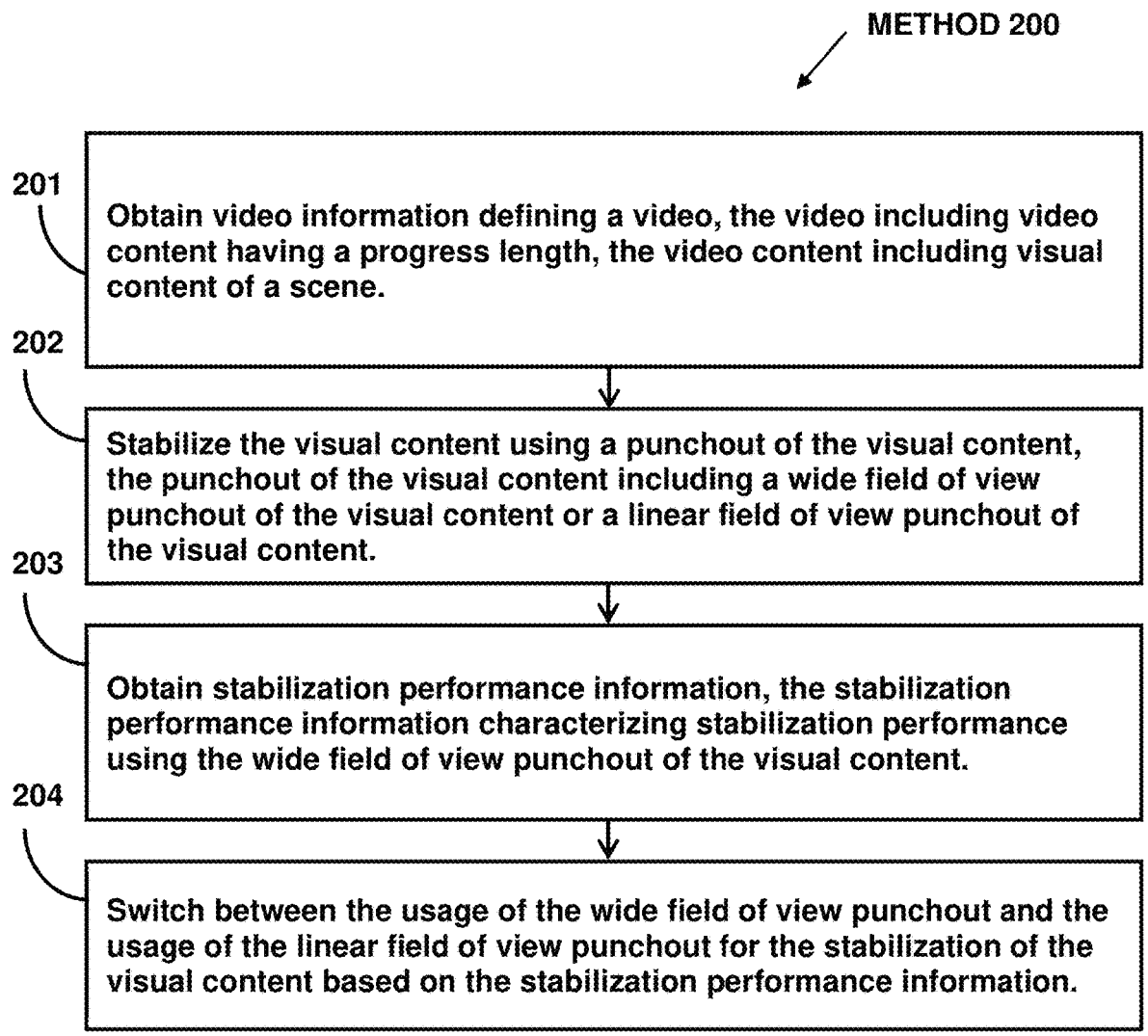
FIG. 2 illustrates an example method for stabilizing videos.

FIG. 2 illustrates method 200 for stabilizing videos. The operations of method 200 presented below are intended to be illustrative. In some implementations, method 200 may be accomplished with one or more additional operations not described, and/or without one or more of the operations discussed. In some implementations, two or more of the operations may occur substantially simultaneously.

In some implementations, method 200 may be implemented in one or more processing devices (e.g., a digital processor, an analog processor, a digital circuit designed to process information, a central processing unit, a graphics processing unit, a microcontroller, an analog circuit designed to process information, a state machine, and/or other mechanisms for electronically processing information). The one or more processing devices may include one or more devices executing some or all of the operation of method 200 in response to instructions stored electronically on one or more electronic storage media. The one or more processing devices may include one or more devices configured through hardware, firmware, and/or software to be specifically designed for execution of one or more of the operations of method 200.

Referring to FIG. 2 and method 200, at operation 201, video information and/or other information may be obtained. The video information may define a video. The video may include video content having a progress length. The video content may include visual content of a scene captured by an image capture device during a capture duration. The visual content may have a field of view. In some implementations, operation 201 may be performed by a processor component the same as or similar to the video information component 102 (Shown in FIG. 1 and described herein).

At operation 202, the visual content may be stabilized using a punchout of the visual content and/or other information. The punchout of the visual content may include a wide field of view punchout of the visual content, a linear field of view punchout of the visual content, and/or other field of view punchout of the visual content. The linear field of view punchout may be smaller than the wide field of view punchout. Stabilized visual content may include a distortion based on usage of the wide field of view punchout such that a straight line within the scene appears curved within the stabilized visual content. The stabilized visual content may not include the distortion based on usage of the linear field of view punchout such that the straight line within the scene appears straight within the stabilized visual content. In some implementations, operation 202 may be performed by a processor component the same as or similar to the stabilization component 104 (Shown in FIG. 1 and described herein).

At operation 203, stabilization performance information and/or other information may be obtained. The stabilization performance information may characterize stabilization performance using the wide field of view punchout of the visual content. In some implementations, operation 203 may be performed by a processor component the same as or similar to the stabilization performance component 106 (Shown in FIG. 1 and described herein).

At operation 204, the usage of the wide field of view punchout and the usage of the linear field of view punchout for the stabilization of the visual content may be switched based on the stabilization performance information and/or other information. In some implementations, operation 204 may be performed by a processor component the same as or similar to the switch component 108 (Shown in FIG. 1 and described herein).

Although the system(s) and/or method(s) of this disclosure have been described in detail for the purpose of illustration based on what is currently considered to be the most practical and preferred implementations, it is to be understood that such detail is solely for that purpose and that the disclosure is not limited to the disclosed implementations, but, on the contrary, is intended to cover modifications and equivalent arrangements that are within the spirit and scope of the appended claims. For example, it is to be understood that the present disclosure contemplates that, to the extent possible, one or more features of any implementation can be combined with one or more features of any other implementation.

What is claimed is:

1. A system for stabilizing videos, the system comprising:
one or more physical processors configured by machine-readable instructions to:
obtain video information defining a video, the video including visual content captured by an image capture device during a capture duration, the visual content having a field of view; and
stabilize the visual content by dynamically changing shape of a punchout of the visual content based on stabilization performance of the visual content, wherein the shape of the punchout determines type of distortion present within stabilized visual content.

2. The system of claim 1, wherein the change in the shape of the punchout based on the stabilization performance of the visual content includes the punchout changing between a wide field of view punchout of the visual content and a linear field of view punchout of the visual content.

3. The system of claim 2, wherein the linear field of view punchout of the visual content is smaller than the wide field of view punchout of the visual content.

4. The system of claim 2, wherein the punchout changing between the wide field of view punchout of the visual content and the linear field of view punchout of the visual content does not cause a linear zooming effect within the stabilized visual content.

5. The system of claim 1, wherein the stabilization performance of the visual content is determined based on an extent to which targeted stabilization of the visual content is able to be performed using the punchout of the visual content.

6. The system of claim 5, wherein the extent to which the targeted stabilization of the visual content is able to be performed using the punchout of the visual content includes a number of instances in which the targeted stabilization violates a stabilization margin for the visual content.

7. The system of claim 6, wherein the targeted stabilization violating the stabilization margin for the visual content includes the targeted stabilization requiring the punchout to extend beyond the field of view of the visual content.

8. The system of claim 5, wherein the extent to which the targeted stabilization of the visual content is able to be performed using the punchout of the visual content includes a spatial amount by which the targeted stabilization requires the punchout to extend beyond the field of view of the visual content.

9. The system of claim 1, wherein the stabilization performance of the visual content is determined based on rotational positions of the image capture device during the capture duration.

10. A method for stabilizing videos, the method performed by a computing system including one or more processors, the method comprising:
obtaining, by the computing system, video information defining a video, the video including visual content captured by an image capture device during a capture duration, the visual content having a field of view; and
stabilizing, by the computing system, the visual content by dynamically changing shape of a punchout of the visual content based on stabilization performance of the visual content, wherein the shape of the punchout determines type of distortion present within stabilized visual content.

11. The method of claim 10, wherein the change in the shape of the punchout based on the stabilization performance of the visual content includes the punchout changing between a wide field of view punchout of the visual content and a linear field of view punchout of the visual content.

12. The method of claim 11, wherein the linear field of view punchout of the visual content is smaller than the wide field of view punchout of the visual content.

13. The method of claim 11, wherein the punchout changing between the wide field of view punchout of the visual content and the linear field of view punchout of the visual content does not cause a linear zooming effect within the stabilized visual content.

14. The method of claim 10, wherein the stabilization performance of the visual content is determined based on an extent to which targeted stabilization of the visual content is able to be performed using the punchout of the visual content.

15. The method of claim 14, wherein the extent to which the targeted stabilization of the visual content is able to be performed using the punchout of the visual content includes a number of instances in which the targeted stabilization violates a stabilization margin for the visual content.

16. The method of claim 15, wherein the targeted stabilization violating the stabilization margin for the visual content includes the targeted stabilization requiring the punchout to extend beyond the field of view of the visual content.

17. The method of claim 14, wherein the extent to which the targeted stabilization of the visual content is able to be performed using the punchout of the visual content includes a spatial amount by which the targeted stabilization requires the punchout to extend beyond the field of view of the visual content.

18. The method of claim 10, wherein the stabilization performance of the visual content is determined based on rotational positions of the image capture device during the capture duration.

19. A system for stabilizing videos, the system comprising:
one or more physical processors configured by machine-readable instructions to:
obtain video information defining a video, the video including visual content captured by an image capture device during a capture duration, the visual content having a field of view; and
stabilize the visual content by dynamically changing shape of a punchout of the visual content based on stabilization performance of the visual content, wherein the change in the shape of the punchout based on the stabilization performance of the visual content includes the punchout changing between a wide field of view punchout of the visual content and a linear field of view punchout of the visual content, the shape of the punchout determining type of distortion present within stabilized visual content, the punchout changing between the wide field of view punchout of the visual content and the linear field of view punchout of the visual content not causing a linear zooming effect within the stabilized visual content.

20. The system of claim 19, wherein:
the stabilization performance of the visual content is determined based on an extent to which targeted stabilization of the visual content is able to be performed using the punchout of the visual content;

the extent to which the targeted stabilization of the visual content is able to be performed using the punchout of the visual content includes:
- a number of instances in which the targeted stabilization violates a stabilization margin for the visual content; or
- a spatial amount by which the targeted stabilization requires the punchout to extend beyond the field of view of the visual content.

* * * * *